(12) United States Patent
Inoue (10) Patent No.: US 7,885,017 B2
(45) Date of Patent: Feb. 8, 2011

(54) OBJECTIVE LENS SYSTEM FOR ENDOSCOPE

(75) Inventor: Takahiro Inoue, Hachioji (JP)

(73) Assignee: Olympus Medical Systems Corp., Tokyo (JP)

( * ) Notice: Subject to any disclaimer, the term of this patent is extended or adjusted under 35 U.S.C. 154(b) by 33 days.

(21) Appl. No.: 12/383,228

(22) Filed: Mar. 20, 2009

(65) Prior Publication Data

US 2009/0237811 A1    Sep. 24, 2009

(30) Foreign Application Priority Data

Mar. 21, 2008  (JP)  ............................. 2008-072720
Feb. 26, 2009  (JP)  ............................. 2009-043855

(51) Int. Cl.
*G02B 9/34* (2006.01)

(52) U.S. Cl. ...................................... 359/781; 359/784

(58) Field of Classification Search ................. 359/781, 359/782, 783, 784, 680
See application file for complete search history.

(56) References Cited

U.S. PATENT DOCUMENTS

| | | | |
|---|---|---|---|
| 5,208,702 A | 5/1993 | Shiraiwa | |
| 5,706,141 A | 1/1998 | Abe | |
| 5,875,059 A | 2/1999 | Estelle | |
| 6,236,521 B1 * | 5/2001 | Nanba | ......................... 359/715 |
| 6,239,921 B1 | 5/2001 | Isono | |
| 6,747,814 B2 | 6/2004 | Abe | |

FOREIGN PATENT DOCUMENTS

| | | |
|---|---|---|
| JP | 04-218011 | 8/1992 |
| JP | 8-27429 | 3/1996 |
| JP | 09-189856 | 7/1997 |
| JP | 10-232349 | 9/1998 |
| JP | 2000-180718 | 6/2000 |
| JP | 3359092 | 10/2002 |
| JP | 2002-365535 | 12/2002 |

* cited by examiner

*Primary Examiner*—Timothy J Thompson
(74) *Attorney, Agent, or Firm*—Kenyon & Kenyon LLP (57) ABSTRACT

An objective lens system for endoscope comprising at least a first negative lens element, a second positive lens element, an aperture stop, and a cemented lens component consisting of a third negative lens element and a fourth positive lens element, and being configured so as to satisfy the conditions (2), (5) and (4) or the conditions (2), (3) and (4) which are mentioned below, whereby the lens system corrects lateral chromatic aberration and longitudinal chromatic aberration with a good balance, favorably corrects aberrations such as chromatic aberration and has a compact composition or a short total length.

$$D2/f<0.9 \tag{2}$$

$$|f/(f_1 \times v_1) + f/(f_2 \times v_2)| < 0.025 \tag{5}$$

$$1.5 < |(f_4 \times v_1)/(f_3 \times v_3)| \tag{4}$$

$$|f/(f_5 \times v_5) - f/(f_1 \times v_1) - f/(f_2 \times v_2)| < 0.025. \tag{3}$$

5 Claims, 7 Drawing Sheets

OBJECTIVE LENS SYSTEM FOR ENDOSCOPE

BACKGROUND OF THE INVENTION

The present invention relates to an objective lens system for endoscope which consists of a small number of lens elements, or has a simple composition.

DESCRIPTION OF PRIOR ART

In recent years in which endoscopes use larger numbers of picture elements, the endoscopes demand objective lens systems in which aberrations are favorably corrected. On the latest days, in particular, a main current is composed of objective lens systems in each of which not only Seidel aberrations are corrected favorably with a combination of several lens elements but also chromatic aberration is corrected favorably with a cemented lens components.

As conventional examples of objective lens systems which use such cemented lens components, there are known objective lens systems disclosed by Japanese patent Kokai Publication No. Hei 8-27429 and Japanese Patent No. 3359092.

Each of the objective lens systems disclosed by these patent bulletins is configured to comprise a cemented lens component which consists of a positive lens element and a negative lens element in order from the object side and is disposed between a stop and an image surface, thereby correcting lateral chromatic aberration and longitudinal chromatic aberration produced by other lens elements.

However, these objective lens systems mentioned as the conventional examples comprise the cemented lens components which are disposed at locations close to the image surfaces, or locations at which rays are high, to correct lateral chromatic aberration, whereby the cemented lens components inevitably have large outside diameters. As a result, the cemented lens component must be thick to reserve sufficient edge thickness. In addition, since imaging locations are generally varied due to manufacturing errors in radii of curvature and thicknesses of the lens elements, it is necessary for the objective lens systems mentioned as the conventional examples to dispose spaces between the cemented lens components and the image surfaces for adjusting the imaging locations. Accordingly, objective lens systems which have compositions comprising cemented lens components disposed close to image surfaces like the conventional examples have a defect to further enlarge total lengths of optical systems.

SUMMARY OF THE INVENTION

An object of the present invention is to provide an objective lens system for endoscope (an objective lens system having a first composition) which comprises at least a first negative lens element, a second positive lens element, an aperture stop, and a cemented lens component consisting of a third negative lens element and a fourth positive lens element in order from the object side, and is configured so as to satisfy the following conditions (1), (2), (5) and (4):

$$0.5 < D1/f < 1.8 \quad (1)$$

$$D2/f < 0.9 \quad (2)$$

$$|f(f_1 \times v_1) + f(f_2 \times v_2)| < 0.025 \quad (5)$$

$$1.5 < |(f_4 \times v_4)/(f_3 \times v_3)| \quad (4)$$

wherein a reference symbol D1 represents an air reduction optical path length from an object side surface of the first lens element to the aperture stop, a reference symbol D2 designates an air reduction optical path length from the aperture stop to an image side surface of the fourth lens element, a reference symbol f denotes a focal length of the objective lens system as a whole, reference symbols $f_1$, $f_2$, $f_3$, and $f_4$ represent focal lengths of the first, second, third and fourth lens elements respectively, and reference symbols $v_1$, $v_2$, $v_3$ and $v_4$ designates Abbe's numbers of the first, second, third and fourth lens elements respectively.

Furthermore, another object of the present invention is to provide an objective lens system for endoscope which is configured to solve the above described problem, or to provide an objective lens system for endoscope (an objective lens system having a second composition) which consists of a first negative lens element, a second positive lens element, an aperture stop, a cemented lens component consisting of a third negative lens element and a fourth positive lens element, and a fifth positive lens element in order from the object side, and is configured so as to satisfy the following conditions (1), (2), (3) and (4):

$$0.5 < D1/f < 1.8 \quad (1)$$

$$D2/f < 0.9 \quad (2)$$

$$|f(f_5 \times v_5) - f(f_1 \times v_1) - f(f_2 \times v_2)| < 0.025 \quad (3)$$

$$1.5 < |(f_4 \times v_4)/(f_3 \times v_3)| \quad (4)$$

wherein a reference symbol D1 represents an air reduction optical path length from an object side surface of the first lens element to the aperture stop, a reference symbols D2 designates an air reduction optical path length from the aperture stop to an image side surface of the fourth lens element, a reference symbol f denotes a focal length of the objective lens system as a whole, reference symbols $f_1$, $f_2$, $f_3$, $f_4$ and $f_5$ represent focal lengths of the first, second, third, fourth and fifth lens elements respectively, and reference symbols $v_1$, $v_2$, $v_3$, $v_4$ and $v_5$ designates Abbe's numbers of the first, second, third, fourth and fifth lens elements respectively.

The objective lens system having the first composition according to the present invention is an optical system which comprises at least four lens elements and satisfies the conditions (1), (2), (5) and (4) as described above.

Furthermore, the objective lens system having the second composition according to the present invention is an optical system which consists of five lens elements and satisfies the conditions (1), (2), (3) and (4).

In other words, the objective lens system having the second composition is an optical system which is obtained by disposing the fifth lens element having positive power between the cemented lens component consisting of the third lens element and the fourth lens element, and the image surface in the objective lens system having the first composition.

This objective lens system for endoscope is characterized by consisting of the first negative lens element, the second positive lens element, the aperture stop, the cemented lens component consisting of the third negative lens element and the fourth positive lens element, and the fifth lens element, and being configured to satisfy the conditions (1), (2), (4) out of the above-mentioned conditions (1), (2), (4), (5) and the condition (3) which is adopted in place of the condition (5).

Since an image pickup device is usually incapable of performing highly efficient photoelectric conversion of rays which are incident at large angles of incidence, it is necessary to allow rays to be incident on the image pickup device at optimum angles of incidence.

The objective lens system having the second composition according to the present invention in which the fifth lens element having positive power is disposed between the fourth lens element and an image surface (an image pickup surface of an image pickup device) is capable of optimizing angles of rays which are emergent from the objective lens system and incident on the image pickup device.

For obtaining such an optimizing performance, it is desirable to satisfy the conditions (1), (2), (3) and (4).

The condition (1) defines an air reduction optical path length from the object side surface of the first lens to the aperture stop. If $D1/f$ exceeds an upper limit of 1.8 of the condition (1), the distance from the object side surface of the first lens element to the aperture stop will be long, whereby a pupil will be located farther from a surface of an object. As a result, the optical system will have a large total length. If $D1/f$ is shorter than a lower limit of 0.5 of the condition (1), coma will be produced, thereby degrading image qualities on marginal portions of an image plane.

Furthermore, the condition (2) defines an air reduction optical path length from the aperture stop to the image side surface of the fourth lens element. If $D2/f$ is longer than an upper limit of 0.9 of the condition (2), a convex surface of the cemented lens component will be located at a position where rays are high, thereby resulting in aggravation of lateral chromatic aberration. In addition, since it is necessary to reserve a sufficient distance from the image side surface of the cemented lens component to the fifth lens element for reserving a sufficient imaging location adjusting space, the above described prolongation of a distance from aperture stop to the image side surface of the cemented lens component result in prolongation of the total length of the optical system. Also from such a viewpoint, it is necessary in satisfy the condition (2).

The condition (5) is associated with lateral chromatic aberration. In the condition (5), two terms of $f/(f_1 v_1)$, $f/(f_2 \times v_2)$ are criteria of lateral chromatic aberration to be produced by the first lens element and the second lens element respectively. If an absolute value of a total of the two terms $|f/(f_1 \times v_1)+f/(f_2 \times v_2)|$ exceeds an upper limit of 0.025 of the condition (5), so large an amount of lateral chromatic aberration will be produced by the optical system as a whole, thereby degrading image qualities at the marginal portions of the image. By the way, lateral chromatic aberration is produced little by the third lens element and the fourth lens element of the objective lens system according to the present invention. The objective lens system according to the present invention is capable of favorably correcting lateral chromatic aberration simply by configuring the first lens element and the second lens element so as to satisfy the condition (5).

The condition (4) defines a criterion for a longitudinal chromatic aberration correcting effect of the cemented lens component consisting of the third lens element and the fourth lens element. If $|(f_4 \times v_4)/f/(f_3 \times v_3)|$ is smaller than a lower limit of 1.5 of the condition (4), it will be impossible to sufficiently correct longitudinal chromatic aberration which is produced by the other lens elements, thereby degrading image qualities.

In addition, the above described objective lens system consisting of the five lens elements (the objective lens system having the second composition) satisfies the condition (3) in place of the condition (5). Like the condition (5), the condition (3) is associated with lateral chromatic aberration. Three terms of $f/(f_5 \times v_5)$, $-f/(f_1 \times v_1)$ and $-f/(f_2 \times v_2)$ of the condition (3) are criteria of lateral chromatic aberration to be produced by the fifth lens element, the first lens element and the second lens element respectively. If an absolute value of a total sum of $|f/(f_5 \times v_5)-f/(f_1 \times v_1)-f/(f_2 \times v_2)|$ is not smaller than an upper limit of 0.025 of the condition (3), the optical system as a whole will produce a large amount of lateral chromatic aberration, thereby degrading image qualities at the marginal portions. By the way, lateral chromatic aberration is produced little by the third lens element and the fourth lens element of the objective lens system according to the present invention. The objective lens system is capable of favorably correcting lateral chromatic aberration simply by satisfying the condition (3).

In comparison with a conventional objective lens system, description will be made now in more details of a point that the objective lens system according to the present invention allows the optical system to have a short total length and another point that the objective lens system is capable of correcting lateral chromatic aberration and longitudinal chromatic aberration with a good balance.

In order to correct lateral chromatic aberration in addition to longitudinal chromatic aberration, it is necessary for the conventional objective lens system to dispose a cemented lens component at a location close to an image surface, or a location at which rays are high. For this reason, the cemented lens component has a large outside diameter and must be thick for reserving sufficient edge thickness. In addition, it is necessary to reserve a proper space between the cemented lens component and an image pickup device for reserving an image location adjusting space. For meeting these requisites, the conventional objective lens system tends to prolong a total length of an optical system.

The objective lens system according to the present invention which has the above described composition is configured to correct longitudinal chromatic aberration by satisfying the conditions (2) and (4) which correcting lateral chromatic aberration by satisfying the condition (5) (the condition (3) in case of the objective lens system which consists of the five lenses elements). Accordingly, the objective lens system according to the present invention does not require to dispose a cemented lens at a location close to an image surface at which rays are high and permits shortening a total length of an optical system while reserving a sufficient image location adjusting space. The objective lens system according to the present invention which additionally satisfies the condition (1) permits further shortening a total length of an optical system while favorably correcting Seidel aberrations, coma in particular.

Furthermore, the conventional objective lens system is configured to correct both lateral chromatic aberration and longitudinal chromatic aberration at the same time by disposing a cemented lens at a location close to an image location at which rays are high. If an attempt is made to change a correcting degree only of lateral chromatic aberration by changing a glass material of the cemented lens component and/or radii of curvature on lens surfaces in this case, longitudinal chromatic aberration will be influenced, thereby making it difficult to correct these two kinds of chromatic aberrations with a good balance.

In contrast, the objective lens system according to the present invention is capable of correcting lateral chromatic aberration by satisfying the condition (5) or (3), and correcting longitudinal chromatic aberration by satisfying the conditions (2) and (4).

In other words, the objective lens system according to the present invention permits adjusting correcting degrees of lateral chromatic aberration and longitudinal chromatic aberration independently and respectively. The objective lens system according to the present invention therefore requires no repetition of trial and error for correction of these two kinds of chromatic aberrations.

For the above described objective lens system according to the present invention, it is desirable to compose the third lens of a negative lens element which has a concave surface having high curvature on a side of an image surface. When the third lens element has a concave surface having high curvature on the object side, it will be difficult to configure the other lens elements so as to have positive power sufficient for absorbing negative power of the third lens element, whereby it will be difficult to configure the objective lens system so as to have specifications for use with an endoscope.

When the objective lens system according to the present invention is to consist of the five lens elements, it is desirable to configure the fifth lens element as a plano-convex lens element which has a convex surface on the object side and dispose this fifth plano-convex lens element at a location adjacent to an image pickup device. Such a fifth plano-convex lens element will eliminate a necessity to dispose a useless spacer, thereby making it possible to simplify a composition of a lens barrel.

Furthermore, it is desirable for the objective lens system according to the present invention to dispose the aperture stop and the third negative lens element adjacent to each other. Such disposition will eliminate a necessity to dispose a useless spacer, thereby making it possible to simplify a composition of a lens barrel. In addition, such disposition will eliminate an air layer between the aperture stop and the image side surface of the fourth lens element, thereby facilitating to satisfy the condition (2) or a condition (2-1) which will be described in the next paragraph.

Furthermore, it is more desirable for the above described objective system according to the present invention to satisfy, in place of the conditions (1), (2), (5), (3) and (4), the following conditions (1-1), (2-1), (5-1), (3-1) and (4-1) respectively:

$$0.7 < D1/f < 1.5 \quad (1\text{-}1)$$

$$D2/f < 0.7 \quad (2\text{-}1)$$

$$|f/(f_1 \times v_1) + f/(f_2 \times v_2)| < 0.016 \quad (5\text{-}1)$$

$$|f/(f_5 \times v_5) - f/(f_1 \times v_1) - f/(f_2 \times v_2)| < 0.015 \quad (3\text{-}1)$$

$$1.0 < |(f_4 \times v_4)/(f_3 \times v_3)| \quad (4\text{-}1)$$

wherein a reference symbol D1 represents an air reduction optical path length from the object side surface of the first lens element to the aperture stop, a reference symbol D2 designates a distance an air reduction optical path length from the aperture stop to the image side surface of the fourth lens element, a reference symbol f denotes a focal length of the objective lens system as a whole, reference symbols $f_1$, $f_2$, $f_3$, $f_4$ and $f_5$ represent focal lengths of the first, second, third, fourth and fifth lens elements respectively, and reference symbols $v_1$, $v_2$, $v_3$, $v_4$ and $v_5$ designate Abbe's is numbers of the first, second, third, fourth and fifth lens elements respectively.

These conditions (1-1), (2-1), (5-1), (3-1) and (4-1) define modified ranges of the conditions (1), (2), (5), (3) and (4) using modified upper and lower limits of these conditions. Meanings of the conditions (1-1), (2-1), (5-1), (3-1) and (4-1) as well as reasons for setting the modified upper and lower limits are therefore similar to those described above with reference to the conditions (1), (2), (5), (3) and (4), and definitions of the ranges which are set as described above make it possible to obtain an objective lens system which has more favorably corrected aberrations such as chromatic aberration and a shorter total length.

Furthermore, it is desirable for the objective lens system according to the present invention to select sapphire as a glass material of the first lens element. Sapphire is not only highly refractive but also lowly dispersive but also extremely stable mechanically and chemically. By selecting sapphire as the material of the first lens element, it is possible to satisfy the conditions (5) or (5-1) and (3) or (3-1) easily, and obtain an objective lens system which is excellent in shock resistance and chemical resistance.

DETAILED DESCRIPTION OF THE PREFERRED EMBODIMENTS

Now, the objective lens system according to the present invention will be described in details with reference to the preferred embodiments which are illustrated in the accompanying drawings.

The objective lens systems according to the first through seventh embodiments of the present invention have compositions illustrated in FIG. 1 through FIG. 7 and numerical data listed in the following tables;

[First embodiment]
f = 1.00, $F_{no}$ = 6.33, 2ω = 92°, IH = 0.757,
object distance = ∞

| | | | |
|---|---|---|---|
| $r_1 = \infty$ | $d_1 = 0.29$ | $n_1 = 1.77066$ | $\nu_1 = 71.79$ |
| $r_2 = 0.6942$ | $d_2 = 0.45$ | | |
| $r_3 = 1.7187$ | $d_3 = 1.01$ | $n_2 = 1.73429$ | $\nu_2 = 28.46$ |
| $r_4 = -1.7187$ | $d_4 = 0.09$ | | |
| $r_5 = \infty$ (aperture stop) | $d_5 = 0.04$ | | |
| $r_6 = \infty$ | $d_6 = 0.44$ | $n_3 = 1.93429$ | $\nu_3 = 18.90$ |
| $r_7 = 1.3255$ | $d_7 = 1.11$ | $n_4 = 1.75844$ | $\nu_4 = 52.32$ |
| $r_8 = -1.3255$ | $d_8 = 1.62$ | | |
| $r_9 = \infty$ | | | |

[Second embodiment]
f = 1.00, $F_{no}$ = 6.19, 2ω = 93°, IH = 0.757,
object distance = ∞

| | | | |
|---|---|---|---|
| $r_1 = \infty$ | $d_1 = 0.29$ | $n_1 = 1.77066$ | $\nu_1 = 71.79$ |
| $r_2 = 0.6942$ | $d_2 = 0.45$ | | |
| $r_3 = 1.7187$ | $d_3 = 1.01$ | $n_2 = 1.73429$ | $\nu_2 = 28.46$ |
| $r_4 = -1.7187$ | $d_4 = 0.09$ | | |
| $r_5 = \infty$ (aperture stop) | $d_5 = 0.04$ | | |
| $r_6 = \infty$ | $d_6 = 0.38$ | $n_3 = 1.93429$ | $\nu_3 = 18.90$ |
| $r_7 = 1.3255$ | $d_7 = 0.7$ | $n_4 = 1.75844$ | $\nu_4 = 52.32$ |
| $r_8 = -1.3255$ | $d_8 = 1.62$ | | |
| $r_9 = \infty$ | | | |

[Third embodiment]
f = 1.00, $F_{no}$ = 6.06, 2ω = 81°, IH = 0.679,
object distance = ∞

| | | | |
|---|---|---|---|
| $r_1 = \infty$ | $d_1 = 0.26$ | $n_1 = 1.77066$ | $\nu_1 = 71.79$ |
| $r_2 = 0.623$ | $d_2 = 0.39$ | | |
| $r_3 = 1.542$ | $d_3 = 0.93$ | $n_2 = 1.74706$ | $\nu_2 = 27.79$ |
| $r_4 = -1.542$ | $d_4 = 0.07$ | | |
| $r_5 = \infty$ (aperture stop) | $d_5 = 0.04$ | | |
| $r_6 = -7.198$ | $d_6 = 0.43$ | $n_3 = 1.93429$ | $\nu_3 = 18.90$ |
| $r_7 = 1.323$ | $d_7 = 0.88$ | $n_4 = 1.75844$ | $\nu_4 = 52.32$ |
| $r_8 = -1.323$ | $d_8 = 0.96$ | | |
| $r_9 = 5.849$ | $d_9 = 0.72$ | $n_5 = 1.51825$ | $\nu_5 = 64.14$ |
| $r_{10} = -8.998$ | $d_{10} = 0.43$ | | |
| $r_{11} = \infty$ | | | |

[Fourth embodiment]
f = 1.00, $F_{no}$ = 5.45, 2ω = 93°, IH = 0.763,
object distance = ∞

| | | | |
|---|---|---|---|
| $r_1 = \infty$ | $d_1 = 0.29$ | $n_1 = 1.77066$ | $\nu_1 = 71.79$ |
| $r_2 = 0.700$ | $d_2 = 0.44$ | | |
| $r_3 = 1.732$ | $d_3 = 1.05$ | $n_2 = 1.74706$ | $\nu_2 = 27.79$ |
| $r_4 = -1.732$ | $d_4 = 0.07$ | | |
| $r_5 = \infty$ (aperture stop) | $d_5 = 0.04$ | | |
| $r_6 = \infty$ | $d_6 = 0.49$ | $n_3 = 1.93429$ | $\nu_3 = 18.90$ |
| $r_7 = 1.485$ | $d_7 = 0.99$ | $n_4 = 1.75844$ | $\nu_4 = 52.32$ |
| $r_8 = -1.485$ | $d_8 = 0.75$ | | |
| $r_9 = 5.890$ | $d_9 = 0.81$ | $n_5 = 1.51825$ | $\nu_5 = 64.14$ |
| $r_{10} = \infty$ | $d_{10} = 0.59$ | $n_6 = 1.6135$ | $\nu_6 = 50.40$ |
| $r_{11} = \infty$ | | | |

[Fifth embodiment]
f = 1.00, $F_{no}$ = 7.61, 2ω = 92°, IH = 0.780,
object distance = 9 mm

| | | | |
|---|---|---|---|
| $r_1 = \infty$ | $d_1 = 0.24$ | $n_1 = 1.77066$ | $\nu_1 = 71.79$ |
| $r_2 = 0.808$ | $d_2 = 0.34$ | | |
| $r_3 = 1.126$ | $d_3 = 0.57$ | $n_2 = 1.85504$ | $\nu_2 = 27.78$ |
| $r_4 = \infty$ (aperture stop) | $d_4 = 0.03$ | | |
| $r_5 = \infty$ | $d_5 = 0.27$ | $n_3 = 1.93429$ | $\nu_3 = 18.90$ |
| $r_6 = 1.009$ | $d_6 = 0.62$ | $n_4 = 1.73234$ | $\nu_4 = 54.68$ |
| $r_7 = -1.009$ | $d_7 = 0.70$ | | |
| $r_8 = 2.050$ | $d_8 = 0.83$ | $n_5 = 1.51825$ | $\nu_5 = 64.14$ |
| $r_9 = \infty$ | $d_9 = 0.62$ | $n_6 = 1.6135$ | $\nu_6 = 50.49$ |
| $r_{10} = \infty$ | | | |

-continued

[Sixth embodiment]
f = 1.00, $F_{no}$ = 8.57, 2ω = 90°, IH = 0.783,
object distance = 10 mm

| | | | |
|---|---|---|---|
| $r_1 = \infty$ | $d_1 = 0.23$ | $n_1 = 1.77066$ | $\nu_1 = 71.79$ |
| $r_2 = 0.778$ | $d_2 = 0.30$ | | |
| $r_3 = 1.069$ | $d_3 = 0.56$ | $n_2 = 1.85504$ | $\nu_2 = 27.78$ |
| $r_4 = \infty$ (aperture stop) | $d_4 = 0.03$ | | |
| $r_5 = \infty$ | $d_5 = 0.26$ | $n_3 = 1.93429$ | $\nu_3 = 18.90$ |
| $r_6 = 1.011$ | $d_6 = 0.58$ | $n_4 = 1.73234$ | $\nu_4 = 54.68$ |
| $r_7 = -1.011$ | $d_7 = 1.01$ | | |
| $r_8 = 2.325$ | $d_8 = 0.73$ | $n_5 = 1.88815$ | $\nu_5 = 40.76$ |
| $r_9 = \infty$ | $d_9 = 0.43$ | $n_6 = 1.51825$ | $\nu_6 = 64.14$ |
| $r_{10} = \infty$ | | | |

[Seventh embodiment]
f = 1.00, $F_{no}$ = 7.58, 2ω = 115°, IH = 0.935,
object distance = 7.5 mm

| | | | |
|---|---|---|---|
| $r_1 = \infty$ | $d_1 = 0.21$ | $n_1 = 1.77313$ | $\nu_1 = 71.70$ |
| $r_2 = 0.759$ | $d_2 = 0.54$ | | |
| $r_3 = 1.560$ | $d_3 = 0.59$ | $n_2 = 1.93429$ | $\nu_2 = 18.90$ |
| $r_4 = \infty$ (aperture stop) | $d_4 = 0.03$ | | |
| $r_5 = \infty$ | $d_5 = 0.31$ | $n_3 = 1.93429$ | $\nu_3 = 18.90$ |
| $r_6 = 1.034$ | $d_6 = 0.80$ | $n_4 = 1.73234$ | $\nu_4 = 54.68$ |
| $r_7 = -1.034$ | $d_7 = 1.02$ | | |
| $r_8 = 3.336$ | $d_8 = 0.87$ | $n_5 = 1.51825$ | $\nu_5 = 64.14$ |
| $r_9 = \infty$ | $d_9 = 0.72$ | $n_6 = 1.61641$ | $\nu_6 = 50.20$ |
| $r_{10} = \infty$ | | | |

In each of the embodiments described above, the conditions have values which are listed in the following tables:

[First embodiment]

| | |
|---|---|
| Condition (1) | 1.29 |
| Condition (2) | 0.899 |
| Condition (4) | 2.08 |
| Condition (5) | 0.0108 |

[Second embodiment]

| | |
|---|---|
| Condition (1) | 1.29 |
| Condition (2) | 0.63 |
| Condition (4) | 1.92 |
| Condition (5) | 0.011 |

[Third embodiment]

| | |
|---|---|
| Condition (1) | 1.14 |
| Condition (2) | 0.76 |
| Condition (3) | 0.0109 |
| Condition (4) | 2.41 |

[Fourth embodiment]

| | |
|---|---|
| Condition (1) | 1.27 |
| Condition (2) | 0.86 |
| Condition (3) | 0.0103 |
| Condition (4) | 1.99 |

[Fifth embodiment]

| | |
|---|---|
| Condition (1) | 0.78 |
| Condition (2) | 0.53 |
| Condition (3) | 0.0147 |
| Condition (4) | 2.12 |

[Sixth embodiment]

| | |
|---|---|
| Condition (1) | 0.73 |
| Condition (2) | 0.50 |
| Condition (3) | 0.0105 |
| Condition (4) | 2.10 |

[Seventh embodiment]

| | |
|---|---|
| Condition (1) | 0.96 |
| Condition (2) | 0.65 |
| Condition (3) | 0.0151 |
| Condition (4) | 2.21 |

In the numerical data listed above, a reference symbol f represents a total length of the objective lens system as a whole, a reference symbol $F_{no}$ designates an F number, a reference symbol $2\omega$ denotes a total field angle, a reference symbol IH represent an image height, reference symbols $r_1$, $r_2$, . . . designate radii of curvature on respective lens surfaces, reference symbols $d_1$, $d_2$, . . . denote thicknesses of respective lens elements and airspaces therebetween, reference symbols $n_1$, $n_2$, . . . represent refractive indices of the respective lens elements for the e-line, and reference symbols $v_1$, $v_2$, . . . designate Abbe's numbers of the respective lens elements for the d-line. By the way, lengths such as $r_1$, $r_2$, . . . are defined in a unit of millimeter.

Figure 1:
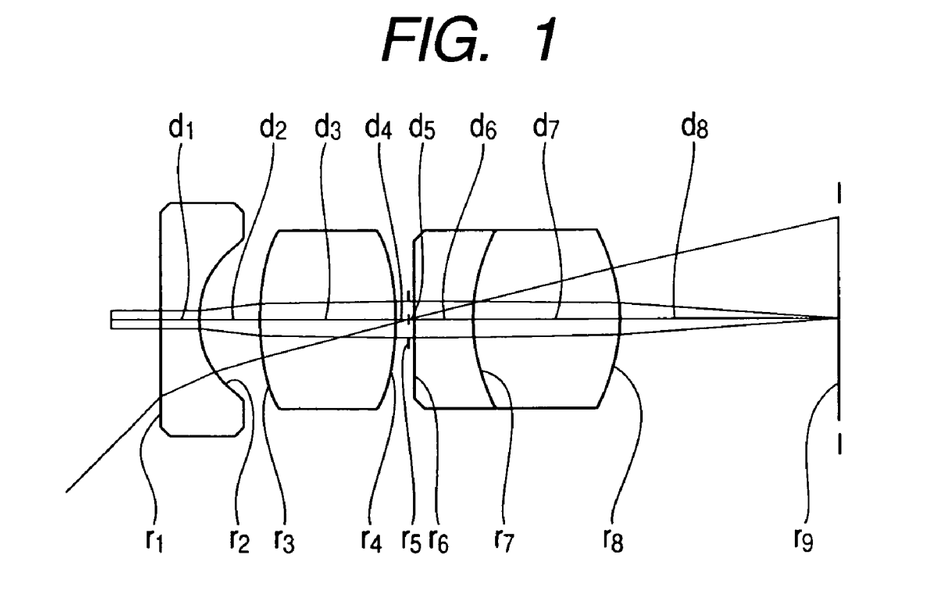
FIG. 1 is a sectional view illustrating a composition of an objective lens system according to a first embodiment of the present invention.

The objective lens system according to the first embodiment of the present invention has a composition illustrated in FIG. 1, or consists of a first negative lens element ($r_1$ to $r_2$) which is a plano-concave lens element, a second positive lens element ($r_3$ to $r_4$) which is a biconvex lens element, an aperture stop ($r_5$) and a cemented lens component consisting of a third negative lens element ($r_6$ to $r_7$) which is a plano-concave lens element and a fourth positive lens element ($r_7$ to $r_8$) which is a biconvex lens element in order from the object side. In addition, a reference symbol $r_9$ used in FIG. 1 represents an image surface.

The first embodiment satisfies the conditions (1), (2), (5) and (4) or the conditions (1-1), (5-1) and (4-1) as shown in the above table.

Figure 2:
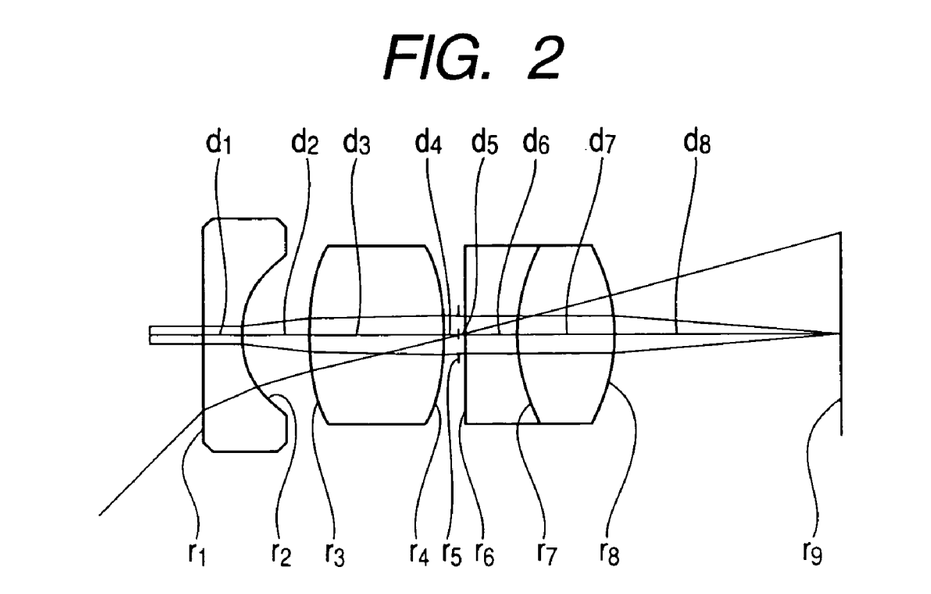
FIG. 2 is a sectional view illustrating a composition of an objective lens system according to a second embodiment of the present invention.

The objective lens system according to the second embodiment of the present invention has a composition illustrated in FIG. 2, or consists in order from the object side of a first negative lens element ($r_1$ to $r_2$) which is a plano-concave lens element, a second positive lens element ($r_3$ to $r_4$) which is a biconvex lens element, an aperture stop ($r_5$), and a cemented lens component consisting of a third negative lens element ($r_6$ to $r_7$) which is a plane-concave lens element and a fourth positive lens element ($r_7$ to $r_8$) which is a biconvex lens element. In addition, a reference symbol $r_9$ used in FIG. 2 represents an image surface.

The second embodiment satisfies the conditions (1), (2), (5), (4), (1-1), (2-1), (5-1) and (4-1) as shown in the above table.

Figure 3:
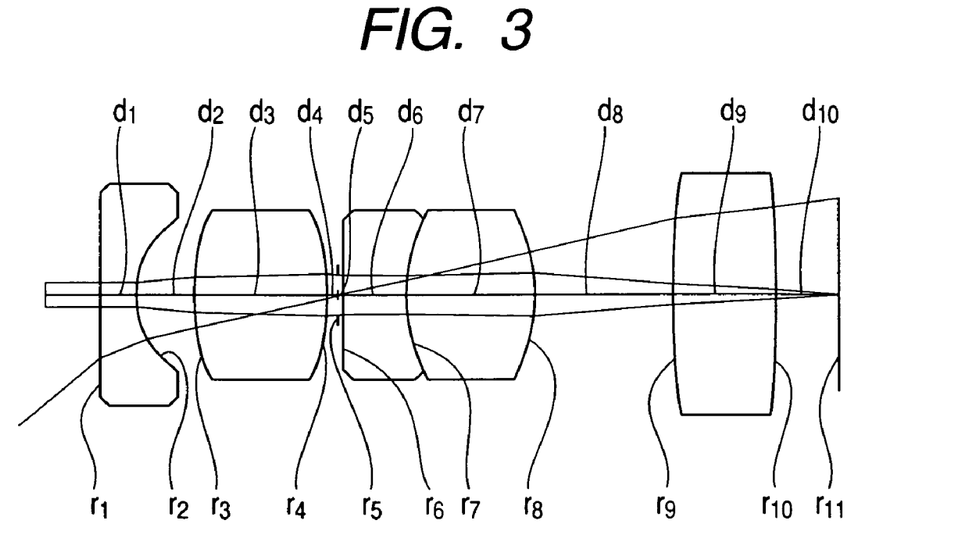
FIG. 3 is a sectional view illustrating a composition of an objective lens system according to a third embodiment of the present invention.

The objective lens system according to the third embodiment of the present invention has a composition illustrated in FIG. 3, or consists of a first negative lens element ($r_1$ to $r_2$) which is a plano-concave lens element, a second positive lens element ($r_3$ to $r_4$) which is a plano-convex lens element, an aperture stop ($r_5$), a cemented lens component consisting of a third negative lens element ($r_6$ to $r_7$) which is a biconcave lens element and a fourth positive lens element ($r_7$ to $r_8$) which is a biconvex lens element, and a fifth positive lens ($r_9$ to $r_{10}$) which is a biconvex lens element in order from the object side. By the way, a reference symbol $r_{11}$ used in FIG. 3 represents an image surface.

The third embodiment satisfies the conditions (1), (2), (3) and (4) or the conditions (1-1), (3-1) and (4-1) as shown in the above table.

Figure 4:
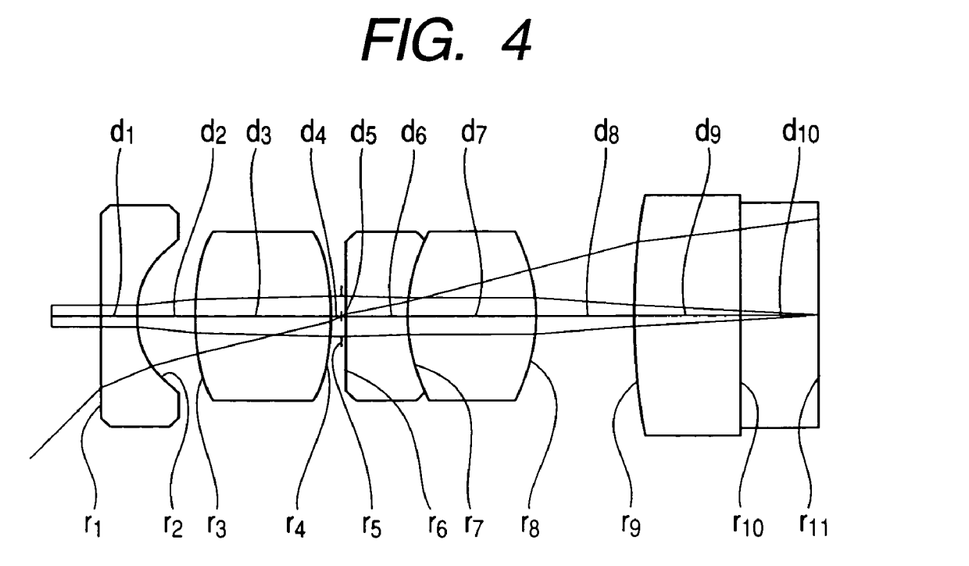
FIG. 4 is a sectional view illustrating a composition of an objective lens system according to a fourth embodiment of the present invention.

The objective lens system according to the fourth embodiment of the present invention has a composition illustrated in FIG. 4, or consists in order from the object side of a first negative lens element ($r_1$ to $r_2$) which is a plano-concave lens element, a second positive lens element ($r_3$ to $r_4$) which is a plano-convex lens element, an aperture stop ($r_9$), a cemented lens component consisting of a third negative lens element ($r_6$ to $r_7$) which is a plano-concave lens element and a fourth positive lens element ($r_7$ to $r_8$) which is a plano-convex lens element, and a fifth positive lens element ($r_9$ to $r_{10}$) which has a plane-convex shape. Furthermore, a plane parallel plate ($r_{10}$ to $r_{11}$) is a cover glass plate which is cemented to the fifth lens element and has an image side surface $r_{11}$ located at an image surface.

The fourth embodiment also satisfies the conditions (1), (2), (3) and (4) or the conditions (1-1), (3-1) and (4-1) as described in the above table.

The fourth embodiment is an example to simplify a barrel composition by configuring an object side surface of the fifth lens element as a planar surface and disposing this surface adjacent to an image pickup device, and configuring an object side surface of the third lens element as a planar surface and disposing this surface adjacent to the aperture stop.

Figure 5:
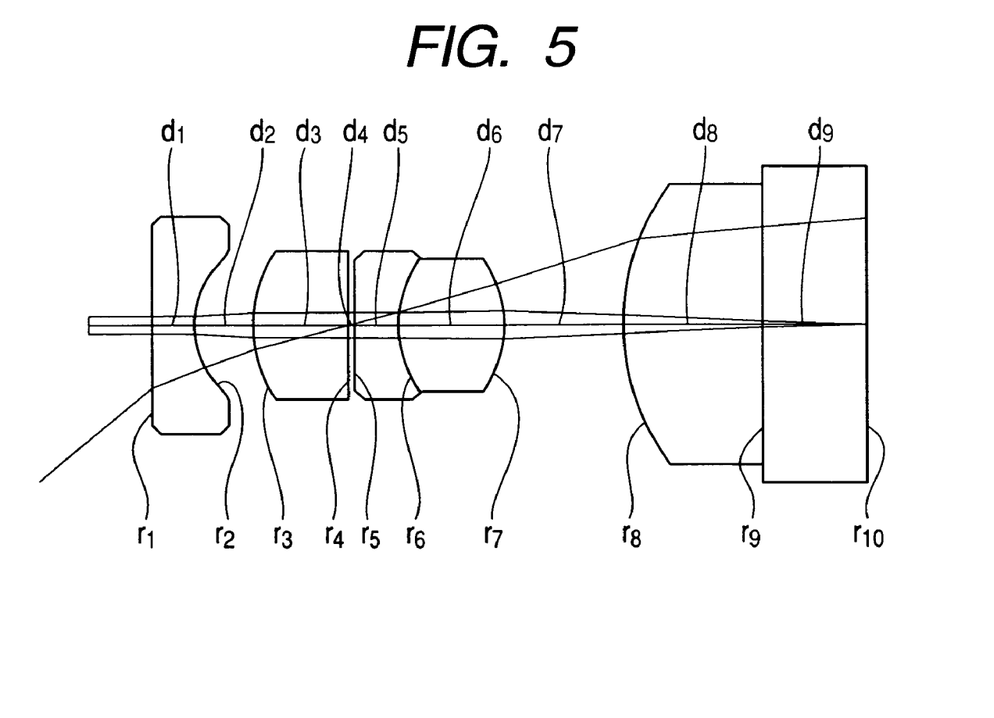
FIG. 5 is a sectional view illustrating a composition of an objective lens system according to a fifth embodiment of the present invention.

Furthermore, the objective lens system according to the fifth embodiment of the present invention has a composition illustrated in FIG. 5, or consists in order from the object side of a first negative lens element ($r_1$ to $r_2$) which is a plano-concave lens element, a second positive lens element ($r_3$ to $r_4$) which has a convexo-planar shape, an aperture stop ($r_4$), a cemented lens component consisting of a third negative lens element ($r_5$ to $r_6$) which is a plano-concave lens element and a fourth positive lens element ($r_6$ to $r_7$) which is a biconvex lens element, and a fifth positive lens element ($r_8$ to $r_9$) which has a convexo-planar shape.

Furthermore, a plane parallel plate ($r_9$ to $r_{10}$) is a cover glass plate which has an object side surface ($r_9$) cemented to the fifth lens element and an image side surface ($r_{10}$) located at an image surface.

In the fifth embodiment, the aperture stop ($r_4$) is disposed on an image side surface of the second lens element.

The fifth embodiment also satisfies the conditions (1), (2), (3) and (4) or the conditions (1-1), (2-1), (3-1) and (4-1) as described in the above table.

The fifth embodiment is an example to further shorten a total length of an optical system by configuring the image side surface of the second lens element as a planar surface and disposing this surface adjacent to the aperture stop. Furthermore, the fifth embodiment is configured to shorten an object distance.

Figure 6:
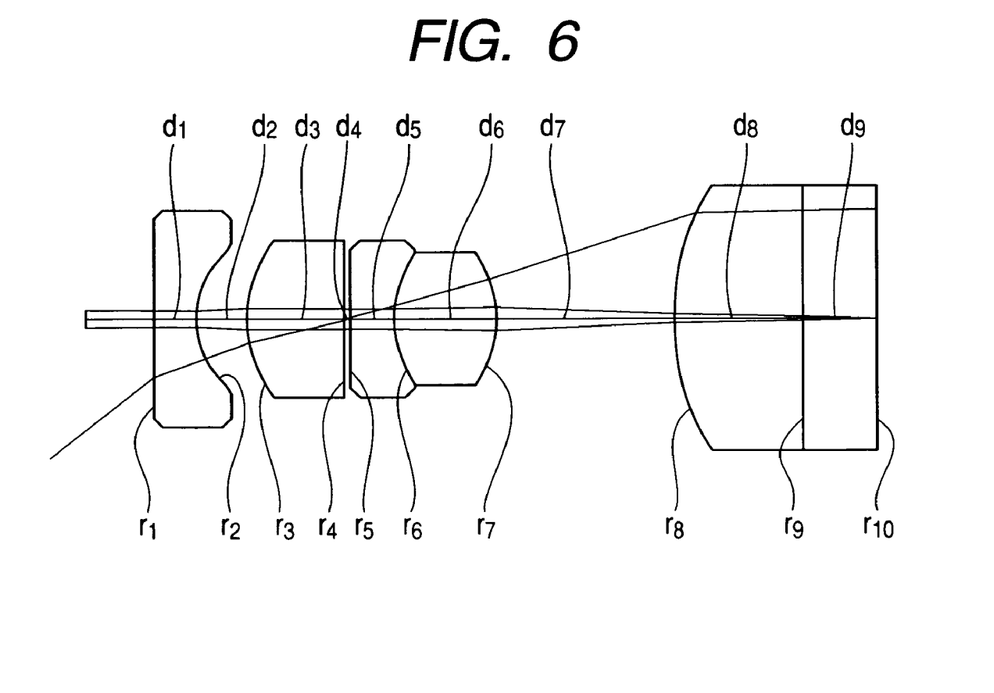
FIG. 6 is a sectional view illustrating a composition of an objective lens system according to a sixth embodiment of the present invention.

The objective lens system according to the sixth embodiment of the present invention has a composition illustrated in FIG. 6, or consists in order from the object side of a first negative lens element ($r_1$ to $r_2$) which is a plano-concave lens element, a second positive lens element ($r_3$ to $r_4$) which has a convexo-planar shape, an aperture stop ($r_4$), a cemented lens component consisting of a third negative lens element ($r_5$ to $r_6$) which has a plano-concave shape and a fourth positive lens element ($r_6$ to $r_7$) which is a biconvex lens element, and a fifth positive lens element ($r_8$ to $r_9$) which has a convexo-planar shape.

Furthermore, a plane parallel plate ($r_9$ to $r_{10}$) is a cover glass plate which has an object side surface ($r_9$) cemented to the fifth lens element and an image side surface ($r_{10}$) located at an image surface.

In the sixth embodiment, the aperture stop ($r_4$) is disposed on an image side surface of the second lens element.

The sixth embodiment also satisfies the conditions (1), (2), (3) and (4) or the conditions (1-1), (2-1), (3-1) and (4-1) as described in the above table.

The sixth embodiment is an example to enhance a telecentricity relative to an image pickup device by enhancing a radius of curvature (power) of the fifth lens element.

Figure 7:
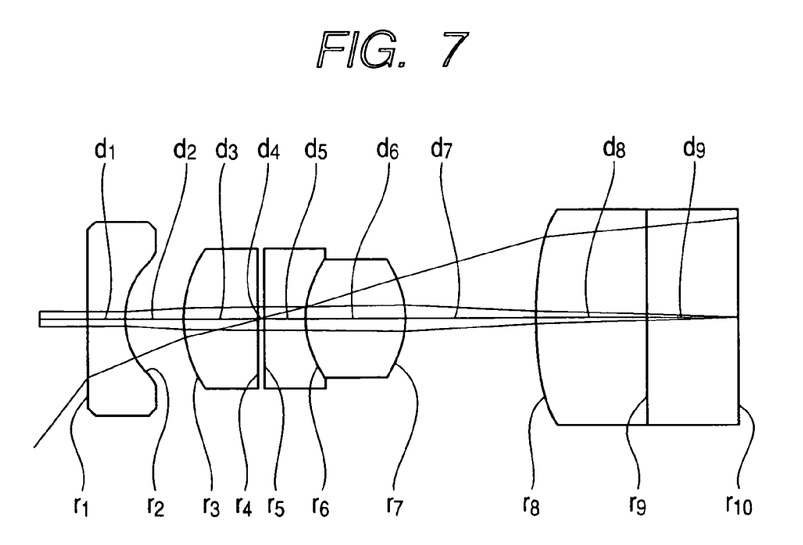
FIG. 7 is a sectional view illustrating a composition of an objective lens system according to a seventh embodiment of the present invention.
Figure 8:
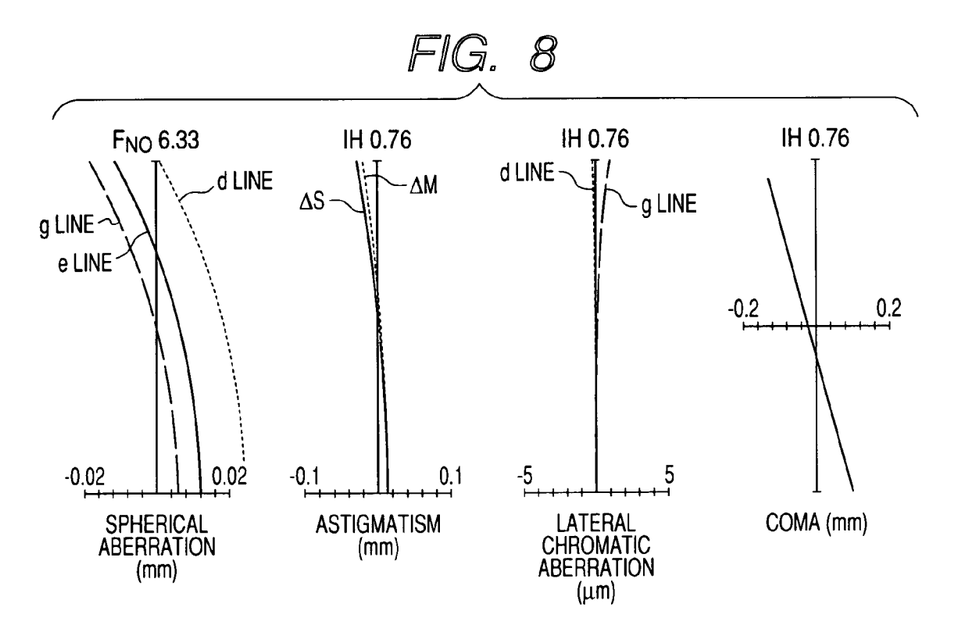
FIG. 8 shows curves illustrating aberration characteristics of the objective lens system according to the first embodiment of the present invention.
Figure 9:
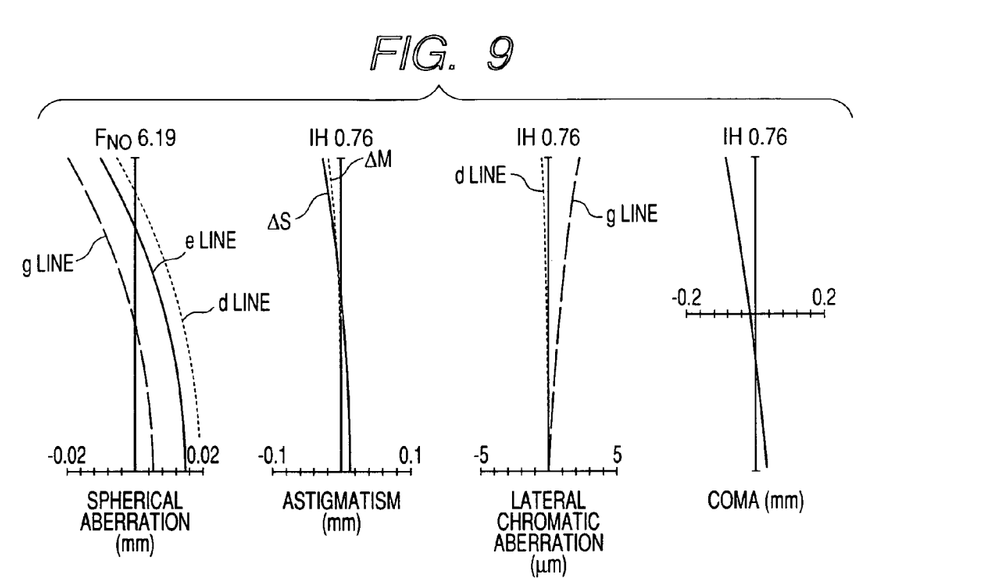
FIG. 9 shows curves illustrating aberration characteristics of the objective lens system according to the second embodiment of the present invention.
Figure 10:
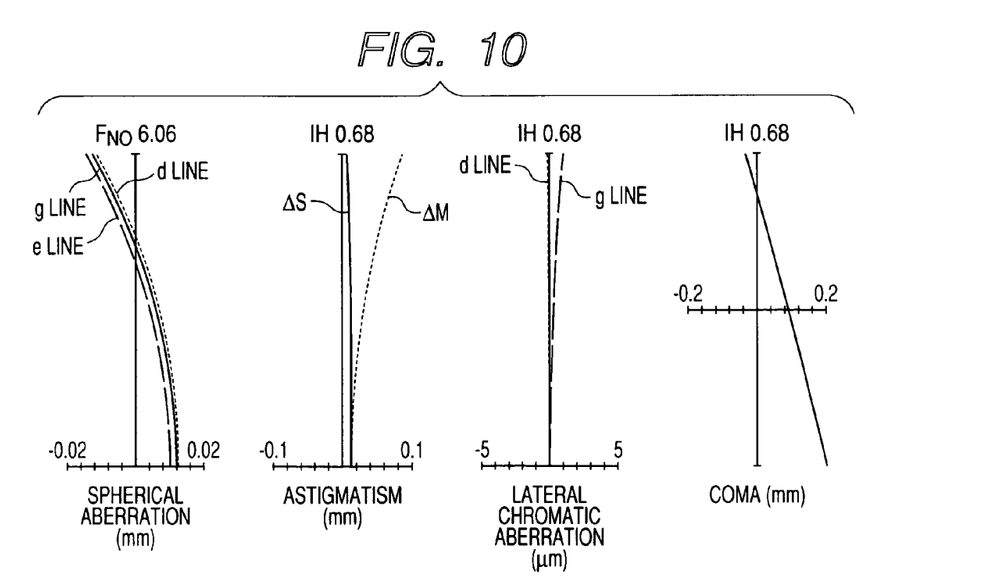
FIG. 10 shows curves illustrating aberration characteristics of the objective lens system according to the third embodiment of the present invention.
Figure 11:
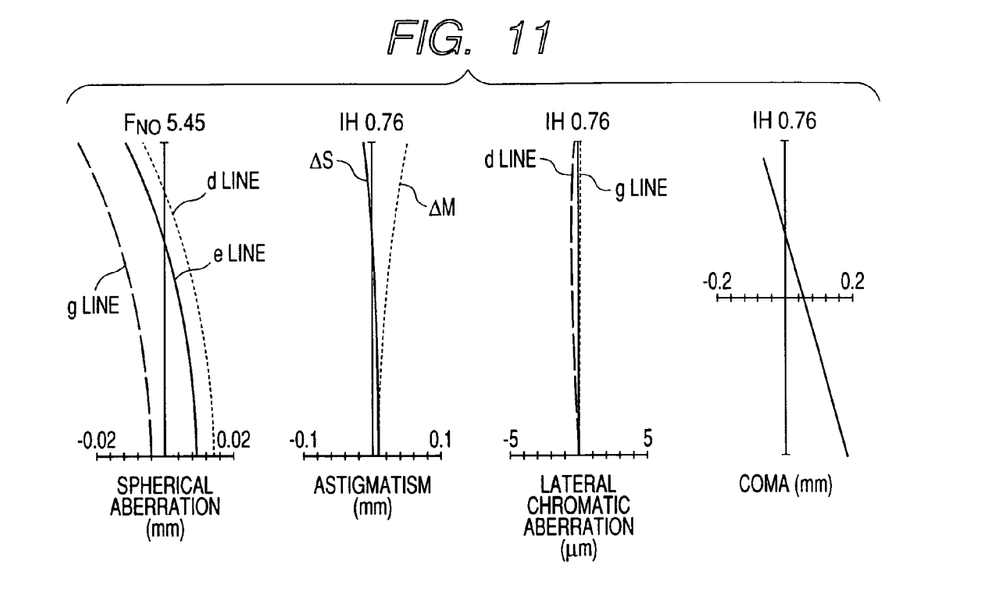
FIG. 11 shows curves illustrating aberration characteristics of the objective lens system according to the fourth embodiment of the present invention.
Figure 12:
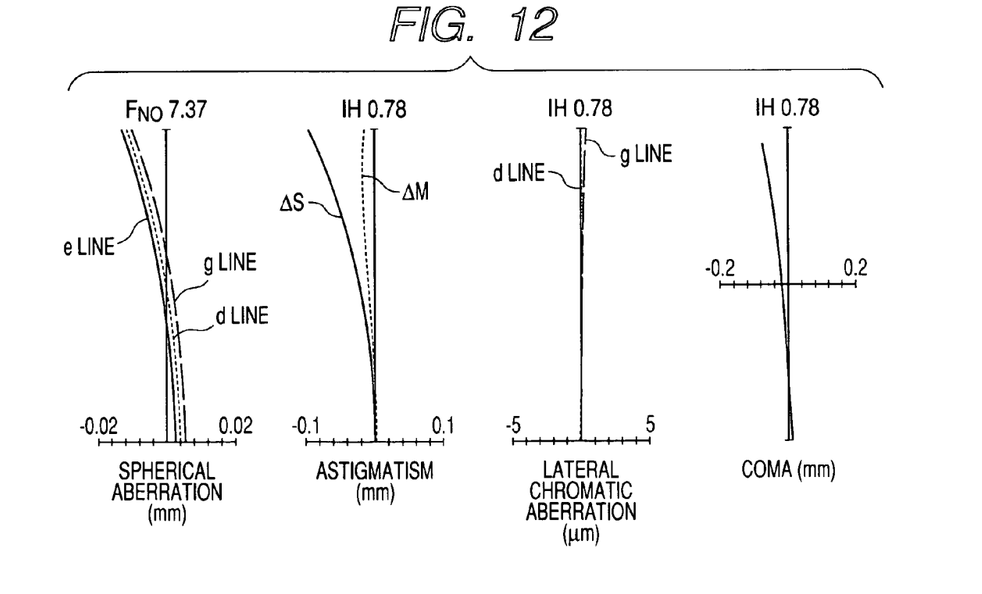
FIG. 12 shows curves illustrating aberration characteristics of the objective lens system according to the fifth embodiment of the present invention.
Figure 13:
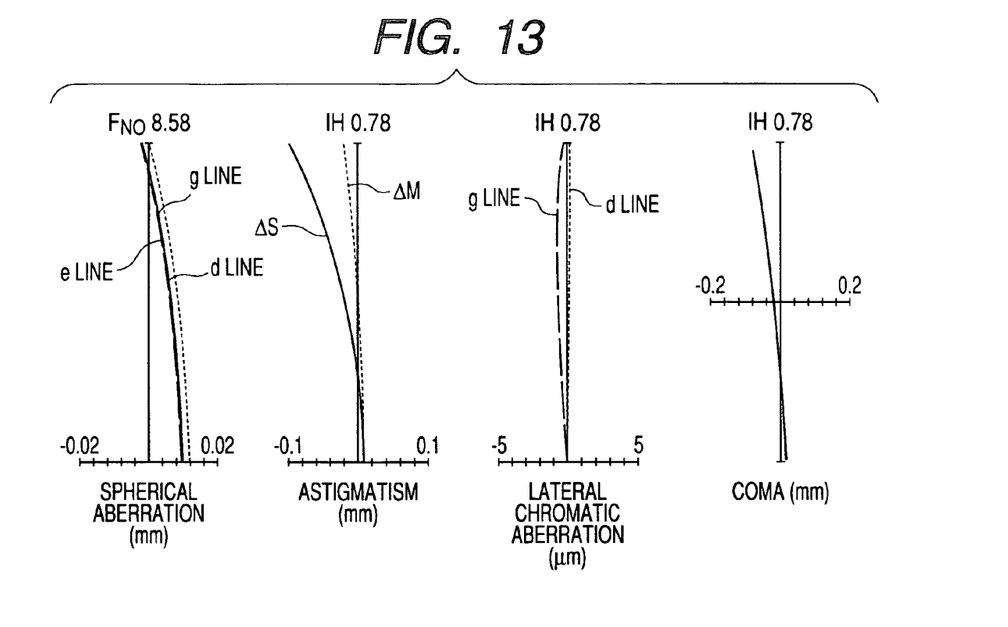
FIG. 13 shows curves illustrating aberration characteristics of the objective lens system according to the sixth embodiment of the present invention.
Figure 14:
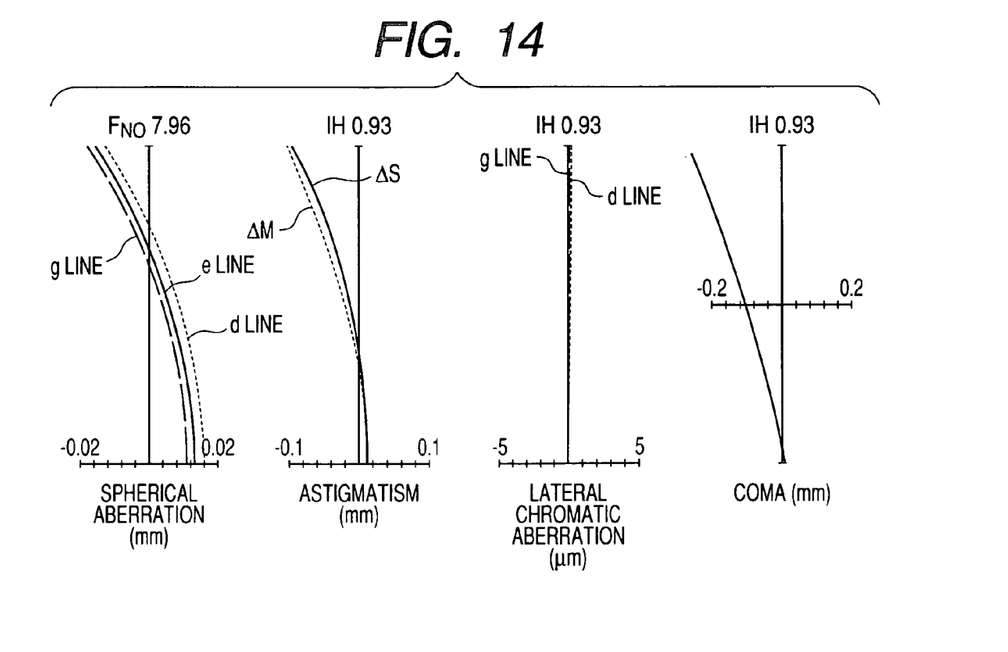
FIG. 14 shows curves illustrating aberration characteristics of the objective lens system according to the seventh embodiment of the present invention.

The objective lens system according to the seventh embodiment of the present invention has a composition illustrated in FIG. 7, or consists in order from the object side of a first negative lens element ($r_1$ to $r_2$) which is a plano-concave lens element, a second positive lens element ($r_3$ to $r_4$) which has a convexo-planar shape, an aperture stop ($r_4$), a cemented lens component consisting of a third negative lens element ($r_5$ to $r_6$) which has a plano-concave shape and a fourth positive lens element ($r_6$ to $r_7$) which is a biconvex lens element, and a fifth positive lens element ($r_8$ to $r_9$) which has a convexo-planar shape.

Furthermore, a plane parallel plate ($r_9$ to $r_{10}$) is a cover glass plate which has an object side surface ($r_9$) cemented to the fifth lens element and an image side surface ($r_{10}$) located on an image surface.

In the seventh embodiment, the aperture stop ($r_4$) is disposed on an image side surface of the second lens element.

The seventh embodiment also satisfies the conditions (1), (2), (3) and (4) or the conditions (1-1), (2-1), (3-1) and (4-1) as described in the above table.

The seventh embodiment is an example in which a total field angle 2ω is further widened.

In addition, sapphire is used as a glass material of the first lens element in each of the objective lens systems according to the first through sixth embodiments.

Aberrations are corrected favorably as illustrated in FIGS. 8 through 14 which show aberrations in the first through seventh embodiments respectively.

The present invention has realized objective lens systems for endoscope which are configured to correct aberrations favorably, or correct longitudinal chromatic aberration and lateral chromatic aberration with a good balance in particular, while keeping compactness to cope with large numbers of picture elements to be used on endoscopes.

The invention claimed is:

1. An objective lens system for endoscope comprising in order from the object side at least:
   a first negative lens element;
   a second positive lens element;
   an aperture stop; and
   a cemented lens component consisting of a third negative lens element and a fourth positive lens element,
   wherein said objective lens system satisfies the following conditions (1), (2), (5) and (4):

$$0.5 < D1/f < 1.8 \quad (1)$$

$$D2/f < 0.9 \quad (2)$$

$$|f/(f_1 \times v_1) + f/(f_2 \times v_2)| < 0.025 \quad (5)$$

$$1.5 < |(f_4 \times v_4)/(f_3 \times v_3)| \quad (4)$$

wherein a reference symbol D1 represents an air reduction optical path length from an object side of the first lens element to the aperture stop, a reference symbol D2 designates an air reduction optical path length from the aperture stop to an image side surface of the fourth lens element, a reference symbol f denotes a total focal length of the objective lens system as a whole, reference symbols $f_1$, $f_2$, $f_3$ and $f_4$ represent focal lengths of the first lens element, the second lens element, the third lens element and the fourth lens element respectively, and reference symbols $v_1$, $v_2$, $v_3$ and $v_4$ designate Abbe's numbers of the first lens element, the second lens element, the third lens element and the fourth lens element respectively.

2. An objective lens system for endoscope consisting in order from the object side:
   a first negative lens element;
   a second positive lens element;
   an aperture stop;
   a cemented lens component consisting of a third negative lens element and a fourth positive lens element; and
   a fifth positive lens element,
   wherein said objective lens system satisfies the following conditions (1), (2), (3) and (4):

$$0.5 < D1/f < 1.8 \quad (1)$$

$$D2/f < 0.9 \quad (2)$$

$$|f/(f_5 \times v_5) - f/(f_1 \times v_1) - f/(f_2 \times v_2)| < 0.025 \quad (3)$$

$$1.5 < |(f_4 \times v_4)/(f_3 \times v_3)| \quad (4)$$

wherein a reference symbol D1 represents an air reduction optical path length from an object side surface of the first lens element to the aperture stop, a reference symbol D2 designates an air reduction optical path length from the aperture stop to an image side surface of the fourth lens element, a reference symbol f denotes a focal length of the objective lens system as a whole, reference symbols $f_1$, $f_2$, $f_3$, $f_4$ and $f_5$ represent focal length of the first lens element, the second lens element, the third lens element, the fourth lens element and the fifth lens element respectively, and reference symbols $v_1$, $v_2$, $v_3$, $v_4$ and $v_5$ designate Abbe's numbers of the first lens element, the second lens element, the third lens element, the fourth lens element and the fifth lens element respectively.

3. The objective lens system for endoscope according to claim 1,
   wherein said third lens element is a negative lens element which has a surface having high curvature on a side of an image surface,
   wherein said aperture stop and said third negative lens element are disposed adjacent to each other, and
   wherein said objective lens system satisfies, in place of said conditions (1), (2), (5) and (4), the following conditions (1-1), (2-1), (5-1) and (4-1);

$$0.7 < D1/f < 1.5 \quad (1\text{-}1)$$

$$D2/f < 0.7 \quad (2\text{-}1)$$

$$|f/(f_1 \times v_1) + f/(f_2 \times v_2)| < 0.016 \quad (5\text{-}1)$$

$$1.9 < |(f_4 \times v_4)/(f_3 \times v_3)|. \quad (4\text{-}1)$$

4. The objective lens system for endoscope according to claim 2,
   wherein said third lens element is a negative lens element which has a surface having high curvature on a side of an image surface,
   wherein said fifth lens element is a plane-convex lens element which has a convex surface on the object side and is disposed adjacent to an image pickup device,
   wherein said aperture stop and said third negative lens element are disposed adjacent to each other, and
   wherein said objective lens system satisfies, in place of said conditions (1), (2), (3) and (4), the following conditions (1-1), (2-1), (3-1) and (4-1);

$$0.7 < D1/f < 1.5 \quad (1\text{-}1)$$

$$D2/f < 0.7 \quad (2\text{-}1)$$

$$|f/(f_5 \times v_5) - f/(f_1 \times v_1) - f/(f_2 \times v_2)| < 0.016 \quad (3\text{-}1)$$

$$1.9 < |(f_4 \times v_4)/(f_3 \times v_3)|. \quad (4\text{-}1)$$

5. The objective lens system for endoscope according to claim 1, 2, 3 or 4, wherein at least the first lens element is made of sapphire.

* * * * *